March 2, 1971  W. J. SOBKOW ET AL  3,567,247
VEHICLE SHOULDER HARNESS ARRANGEMENT
Filed July 24, 1969  2 Sheets-Sheet 1
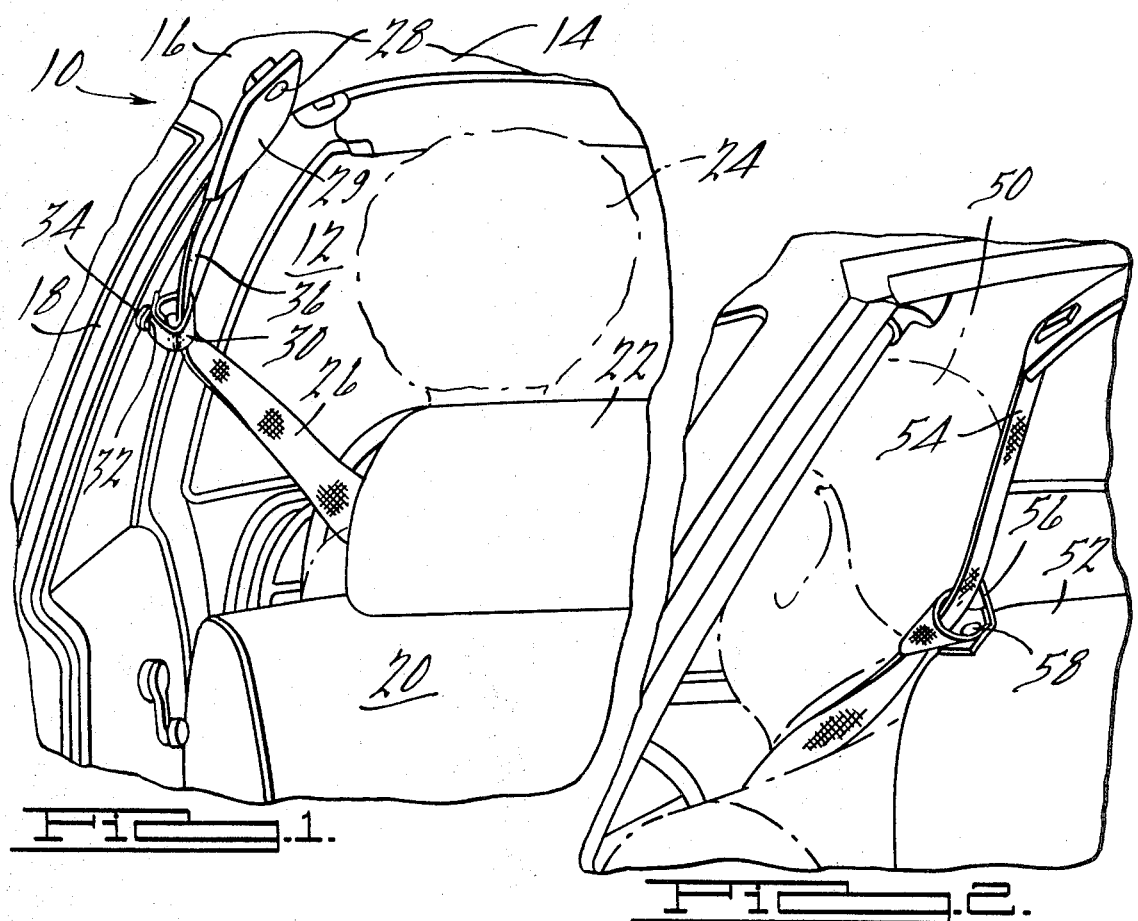
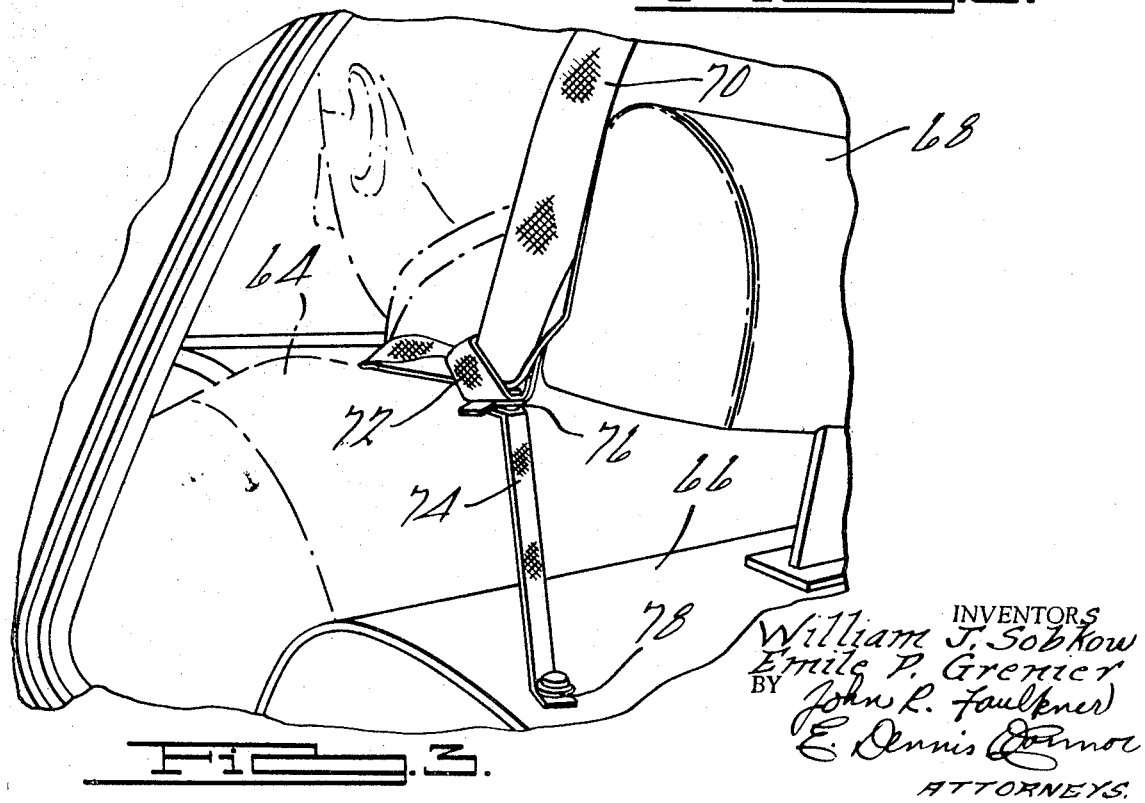
INVENTORS
William J. Sobkow
Emile P. Gremer
BY John R. Faulkner
E. Dennis O'Connor
ATTORNEYS

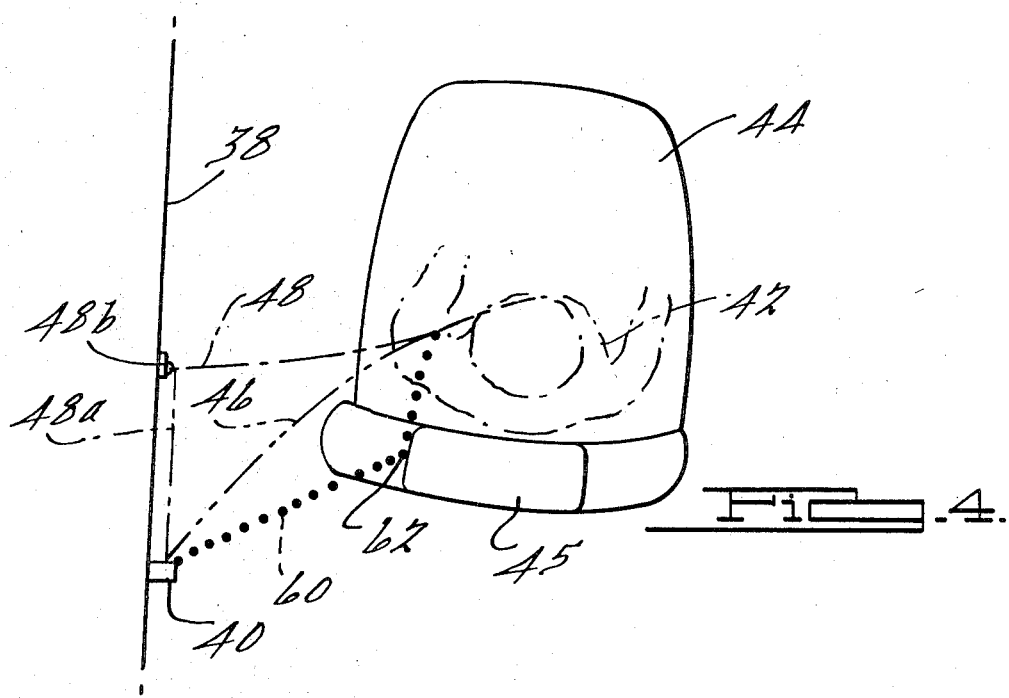
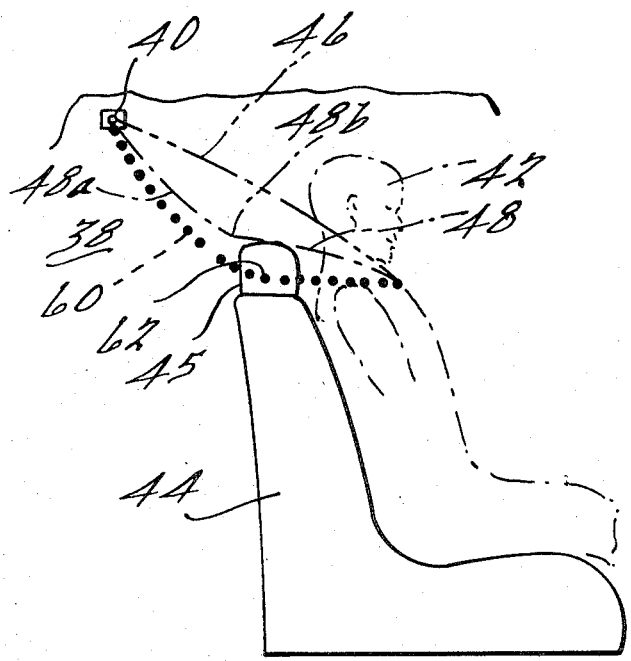

United States Patent Office 3,567,247
Patented Mar. 2, 1971

3,567,247
VEHICLE SHOULDER HARNESS ARRANGEMENT
William J. Sobkow, Livonia, and Emile P. Grenier, Ann Arbor, Mich., assignors to Ford Motor Company, Dearborn, Mich.
Filed July 24, 1969, Ser. No. 844,429
Int. Cl. B60r *21/10*
U.S. Cl. 280—150                   8 Claims

ABSTRACT OF THE DISCLOSURE

A motor vehicle shoulder harness type occupant restraint arrangement including an outboard belt segment having one of its ends secured to vehicle body structure above and rearward of a forward facing passenger seat. A first fastener element carried by and movable along the length of this belt segment is adapted to be releasably engaged by a fixed second fastener element located within the vehicle passenger compartment at a point forward of and below the belt segment anchoring point. In the event of rapid vehicle deceleration causing a seated passenger to move forward against the belt segment, the resultant belt segment loading would cause the fastener elements to separate.

BACKGROUND OF THE INVENTION

Conventional motor vehicle shoulder harness restraining arrangements include an outboard belt segment having one of its ends attached to the vehicle roof rail or body pillar. Because this belt segment is adapted to be positioned diagonally across the torso of a passenger seated on a conventional adjustable, forward facing passenger seat, this point of attachment is above the height of the shoulders of the seated passenger. Also, because the shoulder harness must accommodate passengers of various physical dimensions who position their seats in all possible seat position, this point of attachment must be located behind the vehicle seat when the seat is in its most rearward point of adjustment.

Two disadvantages relative to passenger comfort and convenience arise due to the arrangement described above. First, since the outboard belt segment extends down on in toward a seated passenger from the anchoring point to proximate of the passenger's neck and then extends from the neck area across the torso of the passenger, the portion of belt segment material proximate the passenger tends to "ride up" and chafe against the passenger's neck. While this chaffing may not occur to a sufficient degree to prove overly bothersome to a passenger who positions the seat at a rearward point along the length of possible seat adjustment, a person who positions the seat in a more forward position will find the incidence and severity of this chaffing quite great. This is because a forward seat position requires a greater bend in the outboard belt segment at the point where the belt segment contacts the passenger's body and thus a greater degree of contact between this segment and the passenger.

Second, the length of the outboard belt segment between the belt segment anchoring point and the passenger's neck may, for many sizes of seat passengers, be located in the line of rearward sight over the passenger's left shoulder. By interfering with sight over the left shoulder, this harness arrangement may prove quite inconvenient when the vehicle is being maneuvered at close quarters and in other driving situations.

It is an object of this invention to provide a vehicle shoulder harness arrangement operative to restrain movement of the vehicle passenger and that may be utilized by a passenger without an incidence of inconvenience and discomfort such as those described above. In particular, the shoulder harness arrangement of this invention provides an outboard belt segment that, while anchored to vehicle structure in a conventional location, is arranged to minimize the possibility of chaffing against the neck of the restrained passenger. Also, this belt segment is arranged to minimize the possibility of interference with the sight of the vehicle passenger over the passenger's left shoulder.

SUMMARY OF THE INVENTION

A shoulder harness arrangement constructed in accordance with this invention is adapted for use in a motor vehicle having body structure, a passenger compartment defined by a portion of said structure and a forward facing passenger seat assembly located within said compartment. The shoulder harness arrangement includes an outboard shoulder harness belt segment having one of its ends secured to the vehicle body structure at an anchoring point above and rearward of the seat assembly. This belt segment is adapted to be positioned transversely across the torso of the vehicle passenger seated on the seat assembly and to cooperate with an inboard belt segment to limit movement of the passenger. First fastener means operatively are secured to the belt segment intermediate its ends. Fixed second fastener means, located within the passenger compartment at a point forward of and below the belt segment anchoring point is adapted to releasably engage the first fastener means. These first and second fastener means preferably comprise a snap action fastener that will become disengaged upon a rapid vehicle deceleration causing the belt segment loading due to contact between the passenger and the belt segment.

DESCRIPTION OF THE DRAWING

FIG. 1 is a view of a portion of the interior compartment of a motor vehicle, viewed from behind the driver's seat illustrating a portion of an outboard belt segment included in the shoulder harness arrangement of this invention;

FIG. 2 is a view similar to FIG. 1 but viewed through the left rear window of the vehicle and illustrating a second embodiment of outboard shoulder harness segment arranged according to this invention;

FIG. 3 is a view similar to FIG. 2 but illustrating still another embodiment of shoulder harness arrangement constructed in accordance with this invention;

FIG. 4 is a schematic plan view of a portion of a motor vehicle passenger compartment and illustrating the orientation of outboard shoulder harness belt segments of conventional design and belt segments arranged in accordance with this invention; and FIG. 5 is a schematic side elevation view of the passenger compartment portion and belt segment orientations of FIG. 4.

DETAILED DESCRIPTION OF THE INVENTION

Referring now in detail to the drawings and in particular to FIG. 1 thereof, the numeral 10 denotes in general a portion of a motor vehicle interior passenger compartment. This compartment is defined by a plurality of vehicle body structures including a windshield 12, a roof 14, a roof rail 16 and a window post or B-pillar 18. Within the compartment is located a forward facing, adjustable passenger seat 20 that mounts a conventional headrest 22. A passenger 24 is shown supported on seat 20.

A shoulder harness outboard belt segment 26 is illustrated as secured to roof rail 16 at an anchoring point 28 that is located above and to the rear of seat 20 when the seat is in its most rearward position of adjustment. The end of belt segment 26 proximate anchoring point 28 is surrounded by a conventional protective boot 29.

An elastic sleeve 30 surrounds belt segment 26 and is movable along the length of the belt segment. One half 32 of a snap fastener is carried by sleeve 30. The other half 34 of the snap fastener is mounted on post 18 forward of and below the anchoring point 28 of belt segment 26 on roof rail 16. Fastener portion 34 is adapted to engage releasably in a snap action manner the fastener portion 32 in order to hold a portion 36 of belt segment 26 in an orientation substantially parallel to the longitudinal axis of the vehicle. The location of fastener portion 34 thus becomes an "artificial" anchoring point in that, when the belt segment 26 is in use and fastener portion 32 is connected to fastener portion 34, belt segment 26 is oriented relative to the passenger 24 as if the belt segment 26 was anchored at the location of fastener portion 34. This arrangement in no way affects the functioning of the belt segment 26 since the engagement between fastener portions 32 and 34 is terminated if the passenger 24 is thrown forward against belt segment 26, thereby loading the belt segment.

The advantages of the arrangement illustrated in FIG. 1 may be appreciated by reference to FIGS. 4 and 5 of the drawing. These figures illustrate schematically motor vehicle body structure 38 upon which is located an outboard shoulder harness belt segment anchoring point 40. The belt segments anchored at point 40 are adapted to restrain a vehicle passenger 42 supported in a forward facing passenger seat 44 mounting a headrest 45.

The dot-dot-dash line 46 illustrates the orientation of a conventional outboard shoulder harness belt segment anchored at point 40. It may be appreciated that line 46 extends across the area through which the line of sight of the passenger 42 extends when the passenger wishes to see over his left shoulder. From FIG. 5, it may be seen that line 46 approaches the passenger 42 along a relatively high path and thus is prone to ride up from the shoulder of the passenger and chafe along the left side of the passenger's neck.

The dot-dash line 48 illustrates the location of the belt segment 26 illustrated in FIG. 1. Line portion 48a corresponds to belt segment portion 36 in that it lies substantially parallel to the longitudinal axis of the vehicle. Point 48b, wherein a change in the direction of line 48 occurs, corresponds to the location of the fastener portion 34 on post 18. From FIG. 4, it may be appreciated that line 48 approaches the passenger 42 from point 48b such that only a small bend in line 48 will occur at the neck of the passenger 42. This arrangement greatly reduces the incidence of chaffing between the belt segment and the passenger's neck. Since the line 48 approaches the passenger in a much lower path than does line 46, representing a conventional belt segment, the possibility of the belt segment riding up from the shoulder to the neck of the passenger further is reduced. This lower orientation may be seen by reference to FIG. 5 wherein the line 48 lies substantially below the line 46.

A second embodiment of shoulder harness arrangement according to this invention is illustrated in FIG. 2 of the drawings wherein is shown a vehicle passenger supported on a seat having a headrest 52 of conventional design. An outboard shoulder harness belt segment 54 has one of its ends anchored to vehicle body structure at a point (not shown) behind and above the seat upon which the passenger 50 is supported. An elastic sleeve 56, slidable along the length of belt segment 54, surrounds the belt segment and carries one half of a snap fastener assembly 58. The other half of the snap fastener assembly 58 is positioned on the headrest 52, forward of and below the anchoring point of belt segment 54.

The orientation of belt segment 54 is illustrated by the dotted line 60 in FIGS. 4 and 5. The point 62 represents the location of fastener assembly 58 when the belt is secured via loop 56 to headrest 52. It may be seen from FIGS. 4 and 5 that the arrangement illustrated in FIG. 2 prevents belt segment 54 from sliding up and chaffing against the neck of passenger 50, since belt segment 54 is held down by the fastener assembly 58 acting on it through loop 56. This is illustrated by the low path along which line 60 extends as it approaches passenger 42 from point 62 (FIG. 5).

The outboard shoulder harness belt segment arrangement of FIG. 2 also clears the area immediately behind and to the left of the vehicle passenger in order to allow the vehicle passenger to see to his rear over his left shoulder. This may be appreciated by reference to both FIGS. 4 and 5 wherein the line 60 extends to the inside of and below the potential line of sight of the passenger 42.

FIG. 3 of the drawings illustrates still another embodiment of outboard shoulder harness arrangement according to this invention. In FIG. 3, a vehicle passenger 64 is supported on a seat 66 having a headrest 68. The embodiment of the invention of FIG. 3 is particularly adapted for use where, for some reason, it is undesirable to mount a portion of the belt segment fastener device on the headrest 68. Such circumstances could be caused by the fact that the passenger 64 is relatively tall and thus positions the headrest 68 at a height exceeding the desired height for the location of the fastener assembly.

In the arrangement of FIG. 3, the belt segment 70 is surrounded by an elastic sleeve 72 that is attached to an elastic strap 74 by means of a fastener assembly 76. Fastener assembly 76 may be of the snap fastener type. The end of strap 74 remote from sleeve 72 is secured to the top of seat 76 by a second snap fastener assembly 78. This arrangement provides for an orientation of belt segment 70 identical to the belt segment 54 of FIG. 2. This orientation is, of course, represented by the dotted line 60 of FIGS. 4 and 5. Thus, the arrangement of FIG. 3 is advantageous in an identical manner to the arrangement of FIG. 2.

In the event of rapid vehicle deceleration and loading of the belt segment 70 due to the weight of passenger 64, disengagement of either of fastener assemblies 76 or 78 would occur to allow the belt segment to restrain the passenger in the conventional manner.

The vehicle shoulder harness arrangement of this invention is useful with passengers of almost all physical sizes. Passengers of varying size are accommodated by the fact that the elastic sleeve surrounding the belt segment is movable along the length of the belt segment. This allows the position of the fastener element carried by the belt segment to function satisfactorily regardless of where an individual passenger positions the seat along the path of seat adjustment.

We claim:

1. Occupant restraining means adapted for use in a motor vehicle having body structure defining a passenger compartment and having a forward facing passenger seat assembly located within the compartment and adapted to cooperate with an inboard belt segment to limit movement of a passenger, said restraining means comprising: an outboard shoulder harness belt segment having one of its ends secured to said body structure at an anchoring point above and rearward of said seat assembly and being adapted to be positioned transversely across the torso of a vehicle passenger seated on said seat assembly in cooperation with the inboard belt segment; first fastener means; means for securing said first fastener means to said outboard belt segment intermediate its end points; and fixed second fastener means, located within said passenger compartment at a point forward of and below said outboard belt segment anchoring point, for releasably engaging said first fastener means when said outboard belt segment is positioned transversely across the torso of the vehicle passenger.

2. The occupant restraining means of claim 1, wherein said means for securing said first fastener means to said outboard belt segment is movable along the length of said belt segment.

3. The occupant restraining means of claim 2, wherein said means for securing said first fastener means to said outboard belt segment comprises an elastic sleeve, said first fastener means being carried by said elastic sleeve.

4. The occupant restraining means of claim 1, wherein said second fastener means is located on a body window pillar.

5. The occupant restraining means of claim 1, wherein said seat assembly includes seat back means, said second fastener means being operatively secured to said seat back means.

6. The occupant restraining means of claim 5, wherein said seat back means inclueds a head rest positioned thereupon, said second fastener means being secured to said head rest.

7. Shoulder harness restraining means adapted for use in a motor vehicle having body structure defining a passenger compartment and having a forward facing passenger seat assembly located within the compartment and adapted to cooperate with an inboard belt segment to limit movement of a passenger, said restraining means comprising; an outboard shoulder harness belt segment having one of its ends secured to said body structure at an anchoring point above and rearward of said seat assembly, said belt segment being adapted to lie transversely across the torso of the passenger; first fastener means; means for securing said first fastener means to said outboard belt segment; and fixed second fastener means located within said compartment at a point forward of and below said anchoring point and adapted to releasably engage said first fastener means with a predetermined force, said predetermined force being less than the force exerted on and tending to separate both said fastener means during belt segment loading caused by contact between said passenger and said outboard belt segment during rapid deceleration of said vehicle.

8. Shoulder harness restraining means in accordance with claim 7, wherein said first and second fastener means comprise a snap action fastener assembly.

References Cited

UNITED STATES PATENTS

| | | | |
|---|---|---|---|
| 3,258,293 | 6/1966 | Sharp | 297—389 |
| 3,298,739 | 1/1967 | Scruggs | 280—150 |

KENNETH H. BETTS, Primary Examiner

R. R. SONG, Assistant Examiner